United States Patent
Carroll et al.

[11] 3,914,190
[45] Oct. 21, 1975

[54] METHOD OF PREPARING CELLULAR FOAMS USING COPOLYMERIC STABILIZERS OF SELECTED NITROGENOUS MONOMERS AND ESTERS OF UNSATURATED DIBASIC ACIDS

[75] Inventors: Felix P. Carroll, Chester, Pa.; John R. Panchak, Wilmington, Del.; Nelson N. Schwartz, Broomall, Pa.

[73] Assignee: Air Products and Chemicals, Inc., Allentown, Pa.

[22] Filed: Apr. 10, 1974

[21] Appl. No.: 459,627

[52] U.S. Cl... 260/2.5 AG; 260/2.5 A; 260/2.5 AW; 260/2.5 BE

[51] Int. Cl.[2].............. C08G 18/14; C08G 18/48; C08G 18/62; C08G 18/58

[58] Field of Search...... 260/2.5 BE, 2.5 AG, 2.5 A, 260/2.5 AW

[56] References Cited
UNITED STATES PATENTS

| | | | |
|---|---|---|---|
| 3,085,983 | 4/1963 | Hardy | 260/2.5 AG |
| 3,270,032 | 8/1966 | Erner | 260/2.5 AG |
| 3,304,273 | 2/1967 | Stamberger | 260/2.5 BE |
| 3,376,236 | 4/1968 | Erner | 260/2.5 AG |
| 3,383,351 | 5/1968 | Stamberger | 260/2.5 BE |
| 3,523,093 | 4/1970 | Stamberger | 260/2.5 BE |
| 3,582,499 | 6/1971 | Rogers | 260/2.5 BE |
| 3,746,663 | 7/1973 | Beale | 260/2.5 AG |
| 3,793,236 | 2/1974 | Ashida | 260/77.5 R |
| 3,817,938 | 6/1974 | Ashida | 260/77.5 R |
| 3,823,096 | 7/1974 | Fabris | 260/2.5 AP |

*Primary Examiner*—Donald E. Czaja
*Assistant Examiner*—C. Warren Ivy
*Attorney, Agent, or Firm*—Richard A. Dannells; Barry Moyerman

[57] ABSTRACT

An improvement in the method of preparing a cellular foam from a precursor formulation comprising an isocyanate having at least two isocyanato groups per molecule, a catalyst, and a blowing agent is achieved by adding from 0.2 to 5.0 parts by weight per 100 parts by weight of the precursor formulation of the product of a free radical-initiated polymerization of a polymerizable monomeric system of at least one of the nitrogenous monomers having the following structural formulas:

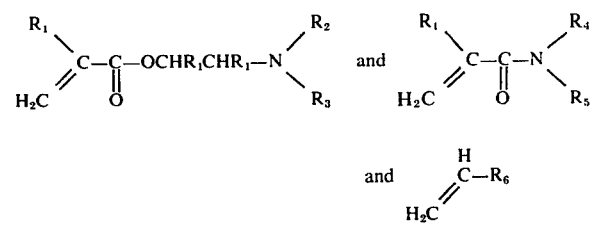

wherein:
$R_1$ is hydrogen or methyl
$R_2$ is hydrogen and $R_3$ is a tertiary alkyl group having 4 – 5 carbon atoms, or
$R_2$ and $R_3$ are alkyl groups having 1 – 5 carbon atoms and are either taken separately or are combined to form a divalent organic group such that the nitrogen atom of said structural formula is included in a 5, 6 or 7 membered ring,
$R_4$ is H or an alkyl group having 1 – 5 carbon atoms, and
$R_5$ is an alkyl or an oxygen substituted alkyl group having 1 – 6 carbon atoms, $R_4$ and $R_5$ are either taken separately or are combined to form a divalent organic group such that the nitrogen atom of said structural formula is included in a 5, 6 or 7 membered ring, and
$R_6$ is an aromatic radical containing nitrogen in the ring, and an ester of an unsaturated dibasic acid having the formula

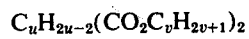

wherein:
$u$ is 2 or 3, and
$v$ is an integer from 3 to 6.

10 Claims, No Drawings

METHOD OF PREPARING CELLULAR FOAMS USING COPOLYMERIC STABILIZERS OF SELECTED NITROGENOUS MONOMERS AND ESTERS OF UNSATURATED DIBASIC ACIDS

BACKGROUND OF THE INVENTION

1. Field of the Invention

This invention relates to an improvement in the method for the preparation of cellular foam stabilizer compositions effective in the stabilization of foam bodies prepared from isocyanate-containing formulations. These foam bodies are of the rigid and semi-rigid type such as poured-in-place installation for refrigerators, freight cars or the like and for crash pads, furniture construction, decorative panels or other similar uses. More particularly, this invention relates to an improvement in the method of stabilization of foam bodies of polyurethane, polyisocyanurate, or polyoxazolidinone groups.

2. Prior Art

Erner, U.S. Pat. No. 3,270,032 describes a stabilizer oil which is a terpolymer obtained by the free radical terpolymerization of N-vinyl pyrrolidone, dibutyl maleate and vinyl acetate in the presence of a long chain monohydric alcohol. The resultant hydroxylic material, per se, is recovered and used as a stabilizer oil which has a degree of effectiveness in the stabilization of foamed polymers, especially rigid polyurethane foams.

Stamberger, U.S. Pat. No. 3,383,351, describes a method of preparing polyurethane foams by first polymerizing an ethylenically unsaturated monomer which includes certain cyclic nitrogenous monomers defined under the Summary of the Invention in the presence of a polyfunctional polyol and then using the resulting polyhydroxylic polymers in place of prior art polyols in a polyurethane foaming process, which process requires the use of silicone oil additives as the cell stabilizer. Stamberger's material serves as the main polyol for urethane formulation, but does not contribute to foam stabilization.

Beale et al, U.S. Pat. No. 3,746,664 describes a cell stabilizer which is a polymer of N-vinyl pyrrolidone, or a copolymer of N-vinyl pyrrolidone and dibutyl maleate or a terpolymer of N-vinyl pyrrolidone, dibutyl maleate and vinyl acetate, where the polymerization must be performed in the presence of a polyfunctional polyether polyol.

SUMMARY OF THE INVENTION

One of the objects of the present invention is to provide a cell stabilizer for the use in the preparation of rigid and semi-rigid foams of not only polyurethane-containing, but of polyoxazolidinone- and polyisocyanurate-containing foams.

Another object of the invention is to provide a readily manageable and soluble or dispersable cell stabilizer for the incorporation in precursor formulations for polyurethane-, polyoxazolidinone- and polyisocyanurate-containing products.

In accordance with this invention, there is provided in a method for preparing a cellular form from a precursor formulation comprising an isocyanate having at least two isocyanato groups per molecule, a catalyst, and a blowing agent, the improvement of adding the product of a free radical-initiated polymerization of a polymerizable monomeric system of at least one of the nitrogenous monomers having the following structural formulas:

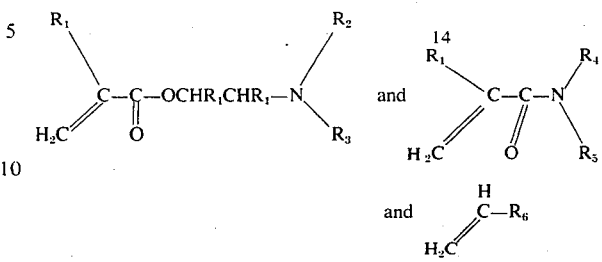

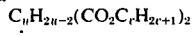

wherein:
$R_1$ is hydrogen or methyl,
$R_2$ is hydrogen and $R_3$ is a tertiary alkyl group having 4 – 5 carbon atoms, or
$R_2$ and $R_3$ are alkyl groups having 1 – 5 carbon atoms and are either taken separately or are combined to form a divalent organic group such that the nitrogen atom of said structural formula is included in a 5, 6 or 7 membered ring,
$R_4$ is H or an alkyl group having 1 – 5 carbon atoms, and
$R_5$ is an alkyl or an oxygen substituted alkyl group having 1 –   carbon atoms, $R_4$ and $R_5$ are either taken separately or are combined to form a divalent organic group such that the nitrogen atom of said structural formula is included in a 5, 6 or 7 membered ring, and
$R_6$ is an aromatic radical containing nitrogen in the ring, and
an ester of an unsaturated dibasic acid having the formula $$C_uH_{2u-2}(CO_2C_vH_{2v+1})_2$$

wherein:
$u$ is 2 or 3, and
$v$ is an integer from 3 to 6.

The copolymerization reaction can be carried out either in bulk or in solution using any suitable organic solvent. On one hand, a volatile solvent can be used which is easily removed subsequent to the copolymerization reaction. Typical examples of such solvents include toluene, benzene, acetonitrile, ethyl acetate, hexane, heptane, dicyclohexane, dioxane, acetone, N,N-dimethylformamide, N,N-dimethyl-acetamide and the like.

On the other hand, the copolymerization reaction can be carried out in the presence of a non-volatile polyfunctional polyether polyol of the type described under Preferred Embodiments of the Present Invention. If it is desired that the resulting cell stabilizer have the advantageous properties as set forth in detail in copending applications Ser. No. 438,222 and Ser. No. 438,241, filed Jan. 31, 1974, the disclosures of which are incorporated herein by reference, this polyether polyol may be treated with a suitable capping or protecting agent described under Preferred Embodiments of the Present Invention to convert the hydroxyl groups to groups substantially inert to isocyanate. The capping treatment may take place either before or after the copolymerization reaction.

PREFERRED EMBODIMENTS OF THE PRESENT INVENTION

Typical examples of the nitrogenous monomers employed in the cell stabilizers of the present invention include 2-dimethylaminoethyl methacrylate; N-t-butylaminoethyl methacrylate; 2-vinylpyridine; 4-vinylpyridine; N-(or 1-) vinylimidazole; 2-methyl, 5-vinylpyridine; 1-vinylbenzimidazole; N-(1,1-dimethyl-3-oxobutyl)-acrylamide (Diacetone Acrylamide); N-methy-N-vinyl acetamide; and acryloyl piperidine.

Typical examples of the esters employed in the cell stabilizers of this invention include dibutyl fumarate, dihexyl fumarate, dibutyl maleate, diamyl methylenemalonate, dipropyl itaconate and dibutyl itaconate.

The free radical initiator used in the polymerization reaction of this invention may be any of the known free radical initiators, including for example, the peroxide type such as benzoyl peroxide, or the azo type such as azo-bis-isobutyronitrile; with the provision that such free radical initiators are effective at the polymerization conditions, preferably being effective at temperatures in the range of from about 30°C to about 140°C.

The polymerization conditions and procedures are within the skills currently available in the art and are selected to obtain the desired degree of polymerization, whcih includes control of chain length, viscosity and weight average molecular weight. The means of effecting control of the product to insure an acceptable state may include the use of known chain transfer agents, such as mercaptan or halogenated hydrocarbons, inasmuch as such agents impart no particularly detrimental effect, when employed in normal amounts, on the quality of the product cell stabilizer.

The polymerization reaction of this invention can be carried out in the presence of a polyfunctional polyether polyol which is the reaction product of the alkylene oxide treatment of water or a polyhydric alcohol having two to eight hydroxyl groups, such as glycerine, propylene glycol, sorbitol, sucrose, aminosucrose, alpha-methyl glucoside, ehtylene glycol, pentaerythritol, trimethylolpropane, and the like. Such a polyolalkylene oxide adduct is further characterized in that the weight average molecular weight is in the range of about 500 to about 5,000. A preferred range with triols is a weight average molecular weight from about 1,500 to about 4,000.

If it is desired that the polyfunctional polyether polyol be capped, typical examples of suitable capping agents include acetic anhydride, acetyl chloride, ketene, benzoyl chloride, benzoic acid, methyl isocyanate, ethyl isocyanate, phenyl isocyanate, and esters of butyric caproic, capric, lauric, myristic, palmitic, stearic and oleic acids, or the free acids, and vinyl ethers such as vinyl methyl ether, vinyl isobutyl ether, and 2,3-dihydrofuran.

The capping reaction takes place under conditions well known in the art; for example, see the description of such reactions in Sandler, S. R. and Karow, "Organic Functional Group Preparations," *Organic Chemistry*, A Series of Monographs Edited by A. T. Blomquist, Academic Press, New York and London, 1968 Edition, pages 246–247, 1971 Edition, Vol. II, page 223 and 1972 Edition, Vol. III, page 13, the descriptions of which are incorporated herein by reference. The temperature of the capping treatment ranges from room temperature to about 150°C, preferably 50° – 140°C. No catalyst is required for this treatment with any of the foregoing capping agents except the vinyl ethers. In that case, any acid-type catalyst is employed to achieve the desired conversion of hydroxyl groups to groups substantially inert to isocyanate. Low molecular weight fragments resulting from the capping process, e.g. hydrogen chloride, acetic acid, or water from capping with acetyl chloride, acetic anhydride, or oleic acid, respectively, are removed by heating under reduced pressure.

The total polymerization reaction product or the polymeric material isolated from the solvent utilized in the polymerization is employed in the isocyanate-containing formulation in an amount in the range of about 0.2 to about 5.0 parts by weight per 100 parts by weight of the precursor formulation.

The polymeric cell stabilizer compositions of this invention exhibit an ease of blendability or dispersibility into the components of the precursor formulation of rigid and semi-rigid polyurethane-, polyoxazolidinone- and polyisocyanurate-containing foams.

It is within the purview of this invention to strip off most or any part of the unreacted remaining monomer and/or the volatile solvent and to have the thus stripped residue considered as the entire reaction product.

The isocyanates used to form the cellular foam in the method of the present invention must have at least two isocyanato groups per molecule. Such polyisocyanates include any of the known aliphatic, cycloaliphatic, araliphatic and aromatic, di- or polyisocyanates. The preferred polyisocyanate are 2,4- and 2,6-toluene diisocyanate (TDI), polymethylene polyphenyl isocyanate (PAPI), diphenyl methane-4, 4'-diisocyanate (MDI), and mixtures thereof. Any of the other conventionally employed polyisocyanates such as condensation products providing a plurality of phenyl groups and a plurality of isocyanato groups : hexamethylenediisocyanate, chlorophenyldiisocyanate, bromophenyldiisocyanate, tetraisocyanatodiphenylmethane and the like may be used.

If it is desired that the cellular foam of this invention contains polyurethane linkages, the precursor foam formulation also includes a polyol which is the reaction product of the alkylene oxide treatment of water or a polyhydric alcohol having two to eight hydroxyl groups, such as glycerine, propylene glycol, sorbitol, sucrose, aminosucrose, alpha-methyl glucoside, ethylene glycol, pentaerythritol, trimethylolpropane, and the like, or mixtures thereof with amines such as ethylenediamine, diethylenetriamine, and the like. Such a polyolalkylene oxide adduct is further characterized in that the weight average molecular weight is in the range of about 400 to about 6,000. The alkylene oxide used in the preparation of the polyether polyols may be ethylene, propylene, or butylene oxide or mixtures thereof. Propylene oxide is preferred and approximately equal results are obtained when the treatment is first with propylene oxide and then with ethylene oxide.

If it is desired that the cellular foam contains polyoxazolidinone linkages, the precursor foam formulation also includes a diepoxide such as vinyl cyclohexene diepoxide, dicyclopentadiene diepoxide, butadiene diepoxide or the reaction product of 2,2-di(4-hydroxyphenyl)propane and epichlorohydrin, as taught in McLaughlin et al, U.S. Pat. No. 3,676,380 and Hayash et al, U.S. Pat. No. 3,673,128.

The blowing agents used to form the foam in the method herein described may be water and/or a volatile organic agent such as dichlorofluoromethane; trichloromonofluoromethane; 1,1-dichloro-1- fluoromethane; 1-chloro-1,1-difluoro-2,2-dichloroethane; 1,1,1-trifluorobutane; 2-chloro-2-fluorobutane; 3,3-difluorobutane; 4,4,4-trifluorobutane; 1,1-difluoroethane; $C_4F_8$ cyclic-Freon C-318; dichlorotetrafluoroethane-Freon 114; trichlorotrifluoroethane-Freon 113; methylene chloride; carbon tetrachloride; butanes; pentanes; and the like. Any suitable blowing agent may be employed in the precursor formulation of this invention.

The catalysts utilized in the preparation of the cellular foams by the method of this invention may include any of the well known amine or tin catalysts such as triethylene diamine, methyltriethylene diamine, (dimethylaminoethyl) morpholine, bis (dimethylaminoethyl)ether, hydroxypropyl imidazole, tetramethyl guanadine, tetramethylbutane diamine, 2,4,6-tris(dimethylaminomethyl)phenol, dibutyl tin diacetate, stannous laurate and mixtures thereof.

The following examples illustrate the method of the present invention and some of the advantages derived therefrom.

EXAMPLE 1

Preparation of a Copolymer of Dibutyl Maleate (DBM) and N-(1,1-dimethyl-3-oxobutyl)-acrylamide (also known as diacetoneacrylamide)

A solution of 20 g. dibutyl maleate, 15 g. N-(1,1-dimethyl-3-oxobutyl)-acrylamide, 0.25 g. benzoyl peroxide and 0.75 ml bromotrichloromethane was placed in a nitrogen flushed crown-capped bottle which was then closed and rotated end-over-end in a bath maintained at 60°C for 16 hours. The bottle was cooled and the product, a viscous syrup, was removed. The proton magnetic resonance spectrum indicated high conversion of both monomers.

EXAMPLE 2

Preparation of a Copolymer of Dimethylaminoethyl Methacrylate and Dibutyl Itaconate (DBI)

A solution of 31.6 g. dimethylaminoethyl methacrylate, 48.4 g. dibutyl itaconate, 0.5 g. azo-bis-isobutyronitrile, and 0.2 ml 1-dodecanethiol in 100 ml of benzene was placed in a nitrogen flushed 100 g. crown-capped bottle which was then closed and rotated end-over-end at 60°C for 16 hours. The bottle was cooled and the solution removed. After heating at 110°C and 2 mm./Hg pressure, 79 g. of viscous amber syrup remained.

EXAMPLE 3

Preparation of a Copolymer of 2-vinylpyridine and DBI

A solution of 21 g. 2-vinylpyridine, 48.4 g. dibutyl itaconate, and 0.5 g. azo-bis-isobutyronitrile in 100 ml methanol was treated as in Example 2. An orange syrup weighing 62.2 g. was obtained.

EXAMPLE 4

Preparation of a Copolymer of N-vinylimidazole and DBM

A solution of 9.4 g. N-vinylimidazole, 22.8 g. dibutyl maleate, 0.5 g. azo-bis-isobutyronitrile, and 0.5 g. 1-dodecanethiol in 100 ml benzene was treated as in Example 2. 31.2 g. of a viscous oil were obtained.

EXAMPLE 5

Preparation of a Copolymer of 4-vinylpyridine and DBM In the Presence of an Uncapped Polyol Two solutions, one consisting of 2.25 g. azo-bis-isobutyronitrile and 0.75 g. t-butylperoxybenzoate in 81 g. of dibutyl maleate, and the other consisting of 55 g. 4-vinylpyridine and 29 g. dibutyl maleate, were simultaneously added over a two hour period to a flask containing 372 g. of CP-3000 (a glycerol based polyoxypropylene triol) which was stirred and maintained at 95°C in a nitrogen atmosphere. When the additions were complete, the temperature was raised to 105°C and the stirring continued an additional hour. The yellow solution was then removed.

EXAMPLE 6

Preparation of a Copolymer of Diacetoneacrylamide and DBM In the Presence of an Uncapped Polyol A solution of 33 g. N-(1,1-dimethyl-3-oxobutyl)-acrylamide and 45 g. dibutyl maleate was prepared and maintained at 50°C. This solution, and a second solution of 0.75 g. azo-bis-isobutyronitrile and 0.25 g. t-butylperoxybenzoate in 75 g. CP-3000, were added over a 2 hour period to a flask containing 85 g. of CP-3000 and were stirred in a nitrogen atmosphere at 95°C. When the addition was complete, the temperature was raised to 105°C for an additional hour. An amber syrup was obtained.

EXAMPLE 7

Preparation of a Copolymer of Dimethylaminoethyl Methacrylate and DBI In the Presence of an Uncapped Polyol The method of Example 5 was followed. One solution contained 31.4 g. dimethylaminoethyl methacrylate and 48 g. dibutyl itaconate and the second solution contained 0.85 g. azo-bis-isobutyronitrile and 0.32 g. t-butyl peroxybenzoate in 80 g. of Polyglycol 15-200 (a glycerol based oxypropylene oxyethylene triol marketed by Dow Chemical Co.) and the solutions were added to 80 g. Polyglycol 15-200. A viscous orange product resulted.

EXAMPLE 8

Preparation of a Copolymer of N-vinylimidazole and DBM In the Presence of a Capped Polyol A mixture of 2,600 g. of Polyglycol 15-200, 300 g. of ethyl vinyl ether and 50 g. of solid potassium bisulfate was refluxed overnight under nitrogen at a bath temperature of 50°C. The solids were then removed by filtration. The filtrate had an acid number of 0.4 and a hydroxy number of 3.2. Dibutyl maleate was added to 25 g. N-vinylimidazole until the volume of the resulting solution was 42 ml. A solution of 0.65 g. azo-bis-isobutyronitrile and 0.2 g. t-butylperoxybenzoate in 42 ml of dibutyl maleate was also prepared. The total weight of the dibutyl maleate used in this Example was 65 g. The two solutions were added over a 2 hour period to 180 g. of the above polyether triacetal which was stirred at 95°C in a nitrogen atmosphere. When the addition was complete, the mixture was stirred an additional hous at 105°C and the stable viscous suspension removed.

EXAMPLE 9

Preparation of a Copolymer of 2-vinylpyridine and DBM In the Presence of a Capped Polyol The procedure of Example 8 was repeated except that one solution contained 28.4 g. of 2-vinylpyridine diluted to 43 ml with dibutyl maleate, and the second solution contained 0.6 g. azo-bis-isobutyronitrile and 0.2 g. t-butylperoxybenzoate diluted to 43 ml with dibutyl maleate. A total of 61.6 g. dibutyl maleate was used in this Example.

EXAMPLES 10 – 19

The effectiveness of the materials prepared in the previous Examples was demonstrated by preparing urethane foams in which these materials were the sole cell stabilizers. A typical rigid foam was prepared using the following formulation in which the ingredients are shown in parts by weight:

| | |
|---|---|
| Selectrofoam"6406[1] | 109 |
| Genetron"R-11SBA[2] | 47 |
| Cell stabilizer | 1.5 |
| DABCO"R8020[3] | 1 |
| Hylene"TIC[4] | 105 |

[1]An amine-sucrose based polyoxypropylene polyol.
[2]A brand of fluorotrichloromethane.
[3]A 20% solution of 1,4-diazabicyclo(2.2.2)octane in a 2-dimethylaminoethanol.
[4]A crude mixture of the 2,4- and 2,6-isomers of toluenediisocyanate.

To prepare the foams, the first four ingredients were thoroughly blended and then quickly mixed with the diisocyanate (8 – 12 seconds). The material was placed in a cardboard container and the cream, gel, tack-free and rise times recorded. The containers were then sectioned and the cell structure characterized. The results are shown in Table I below:

EXAMPLES 20 – 23

The effectiveness of materials prepared in previous Examples was shown by making oxazolidinone-modified polyurethane foams in which these materials were the sole stabilizers. The following formulation was used:

| Ingredient | Parts by Weight |
|---|---|
| Voranol"RS-350[1] | 30 |
| Epon"828[2] | 23 |
| Genetron"11SBA | 33 |
| Cell Stabilizer | 3 |
| DMP-30[3] | 6 |
| Mondur"MR[4] | 200 |

[1]A sucrose initiated polyether polyol.
[2]A condensation product of 2,2-di(4-hydroxyphenyl)-propane and epichlorohydrin.
[3]2,4,6-tris-(dimethylominomethyl)-phenol.
[4]A polymethylene polyphenyl isocyanate.

To prepare the foams, the first five ingredients were thoroughly blended and then quickly mixed with the isocyanate. The material was placed in a container and the cream, gel, tack-free, and rise time were recorded. The products were then sectioned and the cell structure characterized. The results are shown in Table II below:

TABLE II

| | | Time, seconds | | | | |
|---|---|---|---|---|---|---|
| Example | Cell Stabilizer | Cream | Gel | Tack-free | Rise | Cell Structure |
| Control C | None | 47 | 127 | 325 | 420 | Coarse |
| 20 | Product of Example 1 | 40 | 130 | 350 | 480 | Fine, uniform |
| 21 | Product of Example 7 | 45 | 128 | 330 | 450 | Fine, uniform |
| 22 | Product of Example 8 | 47 | 129 | 320 | 445 | Fine, uniform |
| 23 | Product of Example 9 | 48 | 143 | 368 | 470 | Fine, uniform |
| Control D | DC-193 | 42 | 110 | 320 | 410 | Fine, uniform |

EXAMPLES 24 – 25

The effectivness of materials prepared in previous Examples was shown by making isocyanurate foams in which these materials were the sole stabilizers. The following formulation was used:

TABLE I

| Example | Cell Stabilizer | Cream Time, sec. | Gel Time, sec. | Tack-free Time, sec. | Rise Time sec. | Cell Structure |
|---|---|---|---|---|---|---|
| Control A | None | 10 | 45 | 90 | 112 | Very large, irregular |
| 11 | Product of Example 1 | 14 | 46 | 92 | 129 | Medium fine, uniform |
| 12 | Product of Example 2 | 10 | 47 | 90 | 120+ | Fine, uniform |
| 13 | Product of Example 3 | 9 | 48 | 84 | 90 | Fine, uniform |
| 14 | Product of Example 4 | 10 | 43 | 90 | 125 | Fine, uniform |
| 15 | Product of Example 5 | 17 | 55 | 85 | 103 | Fine, uniform |
| 16 | Product of Example 6 | 11 | 42 | 63 | 85 | Fine, uniform |
| 17 | Product of Example 7 | 11 | 48 | 109 | 139 | Fine, uniform |
| 18 | Product of Example 8 | 14 | 58 | 105 | 138 | Fine, uniform |
| 19 | Product of Example 9 | 15 | 58 | 116 | 141 | Fine, uniform |
| Control B | DC-193[1] | 10 | 47 | 95 | 130 | Fine, uniform |

[1]A commercial oxyalkylene-silicone graft copolymer sold by Dow Corning Corporation.

| Ingredient | Parts by Weight |
| --- | --- |
| Genetron 11SBA | 30 |
| Cell Stabilizer | 3 |
| DMP-30 | 14 |
| Mondur MR | 200 |

To prepare the foams, the first three ingredients were thoroughly blended and then quickly mixed with the isocyanate. The material was placed in a container and the cream, gel, tack-free, and rise times were recorded. The products were then sectioned and the cell structure was characterized. The results are shown in Table III below:

TABLE III

| Example | Cell Stabilizer | Cream | Gel | Tack-free | Rise | Cell Structure |
| --- | --- | --- | --- | --- | --- | --- |
| Control E | None | 15 | 32 | 85 | 135 | Medium, irregular |
| 24 | Product of Example 8 | 23 | 47 | 175 | 230 | Fine, uniform |
| 25 | Product of Example 9 | 23 | 46 | 176 | 240 | Fine, uniform |
| Control F | DC-193 | 18 | 36 | 140 | 175 | Fine, uniform |

It can be seen by the results summarized in Table I – III above, that not all of the cell stabilizers of this invention perform equally well in all formulations. Thus, optimum stabilization of one formulation may indicate the selection of a stabilizer prepared according to one embodiment of the present invention, while optimum stabilization of another formulation may require the selection of a stabilizer prepared according to another embodiment; all of which embodiments fall within the scope of the appended claims.

We claim:

1. In a method of preparing a cellular foam from a precursor formulation comprising an isocyanate having at least two isocyanato groups per molecule, a catalyst, and a blowing agent, the improvement which comprises adding from about 0.2 to about 5.0 parts by weight per 100 parts by weight of the precursor formulation of the product of a free radical-initiated polymerization of a polymerizable monomeric system of a nitrogenous monomer selected from the group consisting of monomers having the following structural formulas:

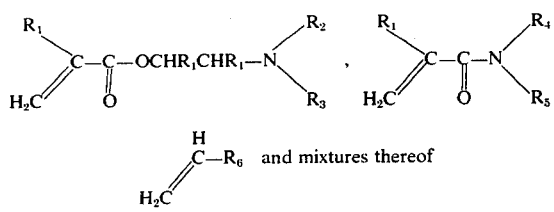

wherein:

$R_1$ is hydrogen or methyl, $R_2$ is hydrogen and $R_3$ is a tertiary alkyl group having 4 – 5 carbon atoms, or $R_2$ and $R_3$ are alkyl groups having 1 – 5 carbon atoms and are either taken separately or are combined to form a divalent organic group such that the nitrogen atom of said structural formula is the only heteroatom and is included in a 5, 6 or 7 membered ring, said divalent organic group having no reactive pendant substituents.

$R_4$ is H or an alkyl group having 1 – 5 carbon atoms, and $R_5$ is an alkyl or a carbonyl substituted alkyl group having 1 – 6 carbon atoms, $R_4$ and $R_5$ are either taken separately or are combined to form a divalent organic group such that the nitrogen atom of said structural formula is the only heteroatom and is included in a 5, 6 or 7 membered ring, said divalent organic group having no reactive pendant substituents, and $R_6$ is a pyridine, imidazole or benzimidazole group, and an ester of an unsaturated dibasic acid having the formula

wherein:

$u$ is 2 or 3, and $v$ is an integer from 3 to 6, said free radical-initiated polymerization being carried out substantially to completion in the presence of a polyfunctional polyether polyol, said polyol is treated either before or after said free radical-initiated polymerization with a capping agent to convert substantially all of the hydroxyl groups of said polyol to groups substantially inert to isocyanate.

2. The method in accordance with claim 1 wherein said nitrogenous monomer is selected from the group consisting of 2-dimethylaminoethyl methacrylate; N-t-butylaminoethyl methacrylate; 2-vinylpyridine; 4-vinylpyridine; N-vinylimidazole; 2-methyl,5-vinylpyridine; 1-vinylbenzimidazole; N-(1,1-dimethyl-3-oxobutyl)-acrylamide, and acryloyl piperidine.

3. The method in accordance with claim 1 wherein said unsaturated dibasic acid is selected from the group consisting of dibutyl fumarate, dihexyl fumarate, dibutyl maleate, diamyl methylenemalonate, dipropyl itaconate and dibutyl itaconate.

4. The method in accordance with claim 1 wherein said capping agent is selected from the group consisting of acetic anhydride, acetyl chloride, ketene, benzoyl chloride, benzoic acid, methyl isocyanate, ethyl isocyanate, phenyl isocyanate, butyric, caproic, capric, lauric, myristic, palmitic, stearic and oleic acids, methyl vinyl ether, n-butyl vinyl ether, isobutyl vinyl ether, and 2,3-dihydrofuran 5. The method in accordance with claim 1 wherein said free radical-initiated polymerization is carried out in the presence of a capped polyfunctional polyether polyol.

6. In a method of preparing a cellular foam from a precursor formulation by comprising an isocyanate having at least two isocyanato groups per molecule, a catalyst, and a blowing agent, the improvement which comprises adding from about 0.2 to about 5.0 parts by weight per 100 parts by weight of the precursor formulation of the product of a free radical-initiated polymerization of a polymerizable monomeric system of a nitrogenous monomer selected from the group consisting of 2-dimethylaminoethyl methacrylate; N-t- butylaminoethyl methacrylate; 2-vinylpyridine; 4-vinylpyridine; N-vinylimidazole; 2-methyl, 5-vinylpyridine; 1-vinylbenzimidazole; N-(1,1-dimethyl-3-oxobutyl)-acrylamide; acryloyl piperidine, and mixtures thereof, and an ester of an unsaturated dibasic acid selected from the group consisting of dibutyl fumarate, dihexyl fumarate, dibutyl maleate, diamyl methylenemalonate, dipropyl itaconate and dibutyl itaconate, said free radical-initiated polymerization being carried out substantially to completion in the presence of a polyfunctional polyether polyol, said polyol is treated either before or after said free radical-initiated polymerization with a capping agent to convert substantially all of the hydroxyl groups of said polyol to groups substantially inert to isocyanate.

7. The method in accordance with claim 6 wherein said capping agent is selected from the group consisting of acetic anhydride, acetyl chloride, ketene, benzoyl chloride, benzoic acid, methyl isocyanate, ethyl isocyanate, phenyl isocyanate, butyric, caproic, capric, lauric, myristic, palmitic, stearic and oleic acids, methyl vinyl ether, n-butyl vinyl ether, isobutyl vinyl ether, and 2,3-dihydrofuran.

8. The method in accordance with claim 6 wherein said precursor formulation also contains a polyol.

9. The method in accordance with claim 6 wherein said precursor formulation also contains a diepoxide.

10. The method in accordance with claim 9 wherein said precursor formulation also contains a polyol.

* * * * *